US010694372B1

(12) United States Patent
Whitman et al.

(10) Patent No.: US 10,694,372 B1
(45) Date of Patent: Jun. 23, 2020

(54) INDEPENDENT AGENT-BASED LOCATION VERIFICATION

(71) Applicant: International Business Machines Corporation, Armonk, NY (US)

(72) Inventors: Todd Russell Whitman, Bethany, CT (US); Jeremy R. Fox, Georgetown, TX (US); Andrew R. Jones, Round Rock, TX (US); John Monnett, Southbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/562,714

(22) Filed: Sep. 6, 2019

(51) Int. Cl.
*H04W 12/00* (2009.01)
*H04W 4/029* (2018.01)

(52) U.S. Cl.
CPC ..... *H04W 12/00503* (2019.01); *H04W 4/029* (2018.02)

(58) Field of Classification Search
CPC .......... H04W 12/00503; H04W 4/029
USPC ............................. 455/456.1–457
See application file for complete search history.

(56) References Cited

U.S. PATENT DOCUMENTS

| | | | |
|---|---|---|---|
| 9,155,125 B1* | 10/2015 | Xue | H04L 63/123 |
| 9,292,705 B2 | 3/2016 | Lemmey et al. | |
| 9,947,015 B1* | 4/2018 | Vildosola | G06K 9/00671 |
| 10,135,835 B1 | 11/2018 | Kandel et al. | |
| 10,194,320 B1 | 1/2019 | Egner et al. | |
| 2011/0287779 A1* | 11/2011 | Harper | G01S 19/03 455/456.1 |
| 2012/0133552 A1* | 5/2012 | Wu | G01S 19/10 342/357.23 |
| 2013/0117775 A1* | 5/2013 | Perry, II | H04L 65/4076 725/14 |
| 2015/0226858 A1* | 8/2015 | Leibner | H04K 3/90 342/357.59 |
| 2016/0315921 A1 | 10/2016 | Dare et al. | |
| 2016/0323261 A1* | 11/2016 | Thompson | G06F 21/31 |

(Continued)

FOREIGN PATENT DOCUMENTS

WO     2016039882 A1    3/2016

OTHER PUBLICATIONS

Dorri et al., Blockchain in Internet of Things: Challenges and Solutions, 2017.

(Continued)

*Primary Examiner* — Michael Y Mapa
(74) *Attorney, Agent, or Firm* — Garg Law Firm, PLLC; Rakesh Garg; Brian Restauro

(57) ABSTRACT

A method that includes receiving, at an agent in a subset of a set of agents, a request to verify a location of an entity, the location of the entity made of unverified location data obtained from the entity, where each agent in the subset of agents satisfies a credibility metric specified in the request. The method also includes generating, at the agent, a second location data corresponding to the entity, causing, responsive to the generating, a computation of a verification value, and transmitting the verification value in a response, where the verification value is indicative of a rejection of the location of the entity responsive to the location of the entity failing to be within a tolerance value of the second location.

19 Claims, 8 Drawing Sheets

(56) References Cited

U.S. PATENT DOCUMENTS

2016/0360354 A1* 12/2016 Rhee ................ H04M 1/72527

OTHER PUBLICATIONS

Liu et al., A Security Framework for the Internet of Things in the Future Internet Architecture, Future Internet 2017, 9, 27; doi:10.3390/fi9030027.

Wilson et al., Trust but Verify: Auditing the Secure Internet of Things, Jun. 2017.

Yang et al., Mechanisms for Validating Authorization/Delegation Hierarchy Using Blockchain Technology, Dec. 27, 2016.

ip.com, Storing and Verifying Network Flows in a Blockchain, Nov. 1, 2017.

ip.com, Method for Providing and Validating Multiple Verified Virtual Alternate Identities for Individuals, Jan. 10, 2019.

Goicochea, Building Smart Cities through location-based technology, Moca Marketing Blog, Dec. 2, 2016.

Miah et al., Superallocation and Cluster-Based Cooperative Spectrum Sensing in 5G Cognitive Radio Network, Intech, 2016, Chapter 9.

Tutorials Point, 5G—Challenges, 2019, https://www.tutorialspoint.com/5g/5g_challenges.htm.

Cranz, The Future of Super-Fast 5G Internet Is a Mess, Mar. 1, 2017, https://gizmodo.com/the-future-of-super-fast-5g-internet-is-a-mess-1792648410.

Best, The race to 5G: Inside the fight for the future of mobile as we know it, Dec. 15, 2014, https://www.techrepublic.com/article/does-the-world-really-need-5g/.

Oreskovic, Google tests waters for potential ultra-fast wireless service, Oct. 15, 2014, https://www.reuters.com/article/us-google-wireless-idUSKCN0I42TN20141015.

* cited by examiner

*FIGURE 7*

VERIFICATION LOCATION DATA FORMAT 700

| INDEX 702 | LOCATION DATA 704 | CREDIBILITY METRIC 706 | VERIFICATION VALUE 708 |
|---|---|---|---|
| 22:13:54.57 710 | 2.474873 -92.890134 | 7 | 7 |
| 08:25:17.18 712 | 30.917936 31.824316 | 3 | 7 |
| 13:27:45.11 714 | 33.741039 151.924935 | 5 | 7 |

US 10,694,372 B1

INDEPENDENT AGENT-BASED LOCATION VERIFICATION

TECHNICAL FIELD

The present disclosure relates generally to a method, system, and computer program product for location verification of a location-reporting entity. More particularly, the present disclosure relates to a method, system, and computer program product for independent agent-based location verification.

BACKGROUND

Entities used for transporting goods or providing services, e.g. a delivery truck, autonomous vehicles, or a ride-share provider, often report their location to aid in scheduling, to track estimated arrival times, or to ensure custody of valuable cargo. An entity is a movable container or structure which includes a location-determining subsystem and a reporting subsystem for notifying an outside receiver the location data associated with that entity. An entity is either self-propelled, such as a vehicle, or transportable, such as a shipping container. In some embodiments, the location-determining subsystem is a GPS receiver.

Businesses perform location tracking to ensure that the entity is at a certain location at a certain time. Sometimes, interested third parties, such as customers awaiting delivery of their package, seek reliable estimated delivery times. For example, an armored car transporting cash reports their location frequently by transmitting global positioning system (GPS) data to a home office. In another example, a food delivery vehicle is monitored by a customer anxiously awaiting their meal delivery.

Occasionally, an entity sends inaccurate location data, deliberate or inadvertently, due to technical failure, a desire by the driver of the entity to appear on time/on schedule, or to confuse or thwart tracking efforts such as during the commission of a crime. A deliberate effort by either the operator of the entity or an unauthorized user to deceive tracking efforts is termed "spoofing".

Spoofing is the act of disguising a communication from an unknown source as being from a known, trusted source. Location spoofing is the act of communicating location information of an entity to make the entity appear to be located at geographical location different than the entity's actual geographical location.

SUMMARY

The illustrative embodiments provide a method, computer program product, and system. An embodiment includes a method that includes receiving, at an agent in a subset of a set of agents, a request to verify a location of an entity, the location of the entity made of unverified location data obtained from the entity, where each agent in the subset of agents satisfies a credibility metric specified in the request. The method also includes generating, at the agent, a second location data corresponding to the entity, causing, responsive to the generating, a computation of a verification value, and transmitting the verification value in a response, where the verification value is indicative of a rejection of the location of the entity responsive to the location of the entity failing to be within a tolerance value of the second location.

An embodiment includes a computer usable program product made of one or more computer-readable storage devices and program instructions stored in a subset of a set of storage devices, the stored program instructions having program instructions to receive, at an agent in a subset of a set of agents, a request to verify a location of an entity, the location of the entity made of an unverified location data obtained from the entity, where each agent in the subset of agents satisfies a credibility metric specified in the request, program instructions to generate, at the agent, a second location data corresponding to the entity, program instructions to cause, responsive to the generating, a computation of a verification value, and program instructions to transmit the verification value in a response, where the verification value is indicative of a rejection of the location of the entity responsive to the location of the entity failing to be within a tolerance value of the second location.

An embodiment includes a system. A system includes a processor, a computer-readable memory, a computer-readable storage device, and program instructions stored on the storage device for execution by the processor via the memory, the stored program instructions having program instructions to receive, at an agent in a subset of a set of agents, a request to verify a location of an entity, the location of the entity made of an unverified location data obtained from the entity, where each agent in the subset of agents satisfies a credibility metric specified in the request, program instructions to generate, at the agent, a second location data corresponding to the entity, program instructions to cause, responsive to the generating, a computation of a verification value, and program instructions to transmit the verification value in a response, where the verification value is indicative of a rejection of the location of the entity responsive to the location of the entity failing to be within a tolerance value of the second location.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 7 depicts an example of a verification request response data format in accordance with an illustrative embodiment.

DETAILED DESCRIPTION

Figure 1:
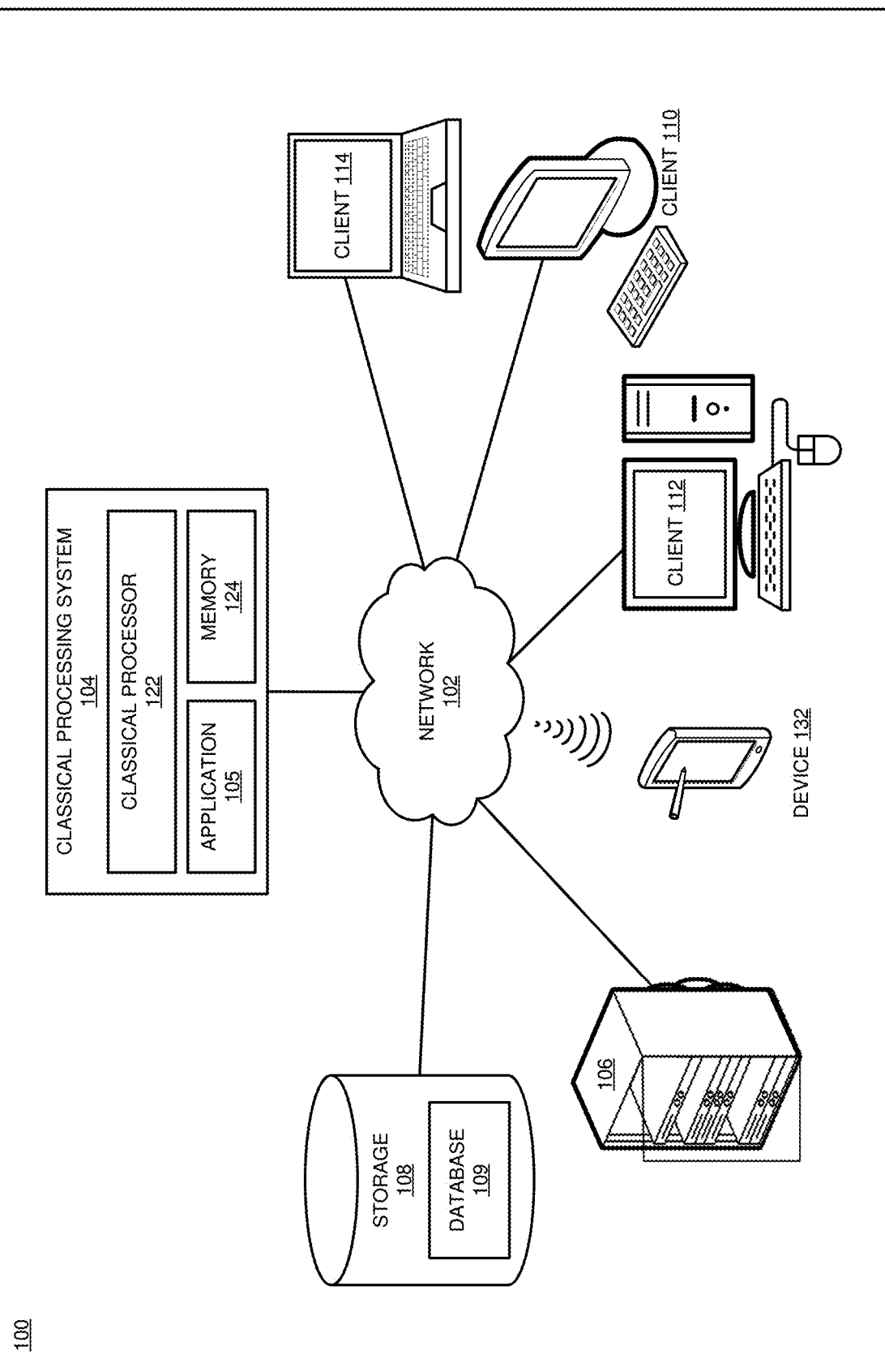
FIG. 1 depicts a block diagram of a network of data processing systems in which illustrative embodiments may be implemented.

The illustrated embodiments recognize that there is a need for verifying an entity's location using independent sources or agents. The agents provide data to verify the location of an entity through the use of imaging and location reporting. Agents are termed agents, location verification agents, or verification agents. The agents are independent when they are utilized, controlled, or operated by an uninterested third party. Employing independent agents is a security feature that ensures that no one source controls all of the agents used to verify a location. Depending on the criticality of the need, such as carrying precious or expensive cargo, a verifier, receiver, person, or system interested in the location of the entity (hereinafter interchangeably referred to as an interested receiver, receiver, or verifier, unless expressly distinguished where used) often require one or more location verification sources to prove the entity was present at a certain location at a certain time.

In some embodiments, the entity is a vehicle. In other embodiments, the entity is an animal fitted with a tracking device, a global positioning system receiver mounted onto a shipping container that transmits location data periodically, a camera mounted onto a police vehicle, a mobile camera on a laptop, a radio frequency identification tag attached to cargo that transmits location data when prompted, or a cell phone carried by a person.

Agents are classified by a credibility metric value (credibility metric). The credibility metric is a value for comparing the relative value, or mathematical weight, of the location data sent by each agent and is determined, in part, by the type of sensor associated with the agent and the inherent accuracy, reliability, and precision of each agent.

Within the scope of the illustrative embodiments, independent verification of the location of an entity is the process of verifying the location of the entity from a location information source other than the entity itself. For example, a delivery vehicle might fail to transmit its present location due to equipment failure, entity operator's negligence, or malicious act of the entity operator or third parties. Without the ability to independently verify the location of a vehicle, cargo might go missing, customer's online orders can be misplaced, or critical medical packages can be diverted or lost.

In addition, people attempting to spoof a system ("spoofers") can attempt to take over an entity's location data transmission for sport or during malicious acts. As an example, an armored car might report inaccurate location due to a hijacking attempt in progress to confuse authorized trackers.

The illustrative embodiments recognize that the presently available tools or solutions for geographical location reporting, such as GPS, triangulation, and other locating technologies, do not address these needs or provide adequate solutions for these needs. The illustrative embodiments used to describe the invention generally address and solve the above-described problems and other problems related to verifying the location of an entity using independent agents.

An embodiment can be implemented as a software application. The application implementing an embodiment can be configured as a modification of an existing location tracking system, as a separate application that operates in conjunction with an existing location tracking system, a standalone application, or some combination thereof.

Particularly, some illustrative embodiments provide a method that uses independent agents such as security cameras and mobile phones to verify the location of an entity within the agent's field of view. A requestor who wants verification of an entity's location specifies the level of verification they are seeking. The requestor can also select the verification type they wish the verifier to utilize, such as using only building security cameras, or only agents associated with public government agency-controlled traffic camera systems. In at least one embodiment, the requestor is the entity itself, and the entity requests verification of its own location data.

Some embodiments include agents that use RFID technology to track containers. Agents employed to track RFID tags first activate the RFID tag with a radio frequency signal, receive and record the response signal from the RFID tag attached to the container, and forward this information for further collation and processing by a server running a verification application.

In another embodiment, an agent uses an audio receiver to track for a specific entity with an identifiable sound, such as a motorcycle, an airborne drone, or a vehicle with a specific mechanical defect. Once detected, the agent records the sound and reports both the sound recording and the estimated location of the entity to the server. Other examples are possible and are not limited by the examples disclosed herein.

One embodiment includes a network of agents that is available to provide location verification services when contacted by a verifier in need of such services. The agents provide proof by sending the required verification to, and recorded by, an immutable recording system which acts as a broker between the agents providing the service and the verifier requesting the service.

Multiple verifiers provide a higher level of confidence, and therefore a higher verification value, that the entity's location data is legitimate as compared to a single verifier verifying the entity's location. The verifier contacts as many agents as necessary to meet the requestors' specific needs and specified verification value. Then, the requestor uses the verification results to make decisions based on the results of the verification request.

In another embodiment, the verifier creates an Internet of Things (IoT) device network to provide location verification which identifies a moving object including a drone, a vehicle, a shipping container on a truck, etc. and transmits the location data via a communications protocol that validates that the entity is/was located at a certain time at a certain location. The IoT device network can use different types of information gathered including, but not limited to, images, photographs, video, audio, telemetry information, and the like.

The verifier offering IoT location verification is able to record an entity location for a given geospatial or geofence area. Events associated with the entity are recorded on an immutable record such as a cloud-based server or a blockchain-enabled system. According to one embodiment, the IoT network communicates across a 5G or other high-speed, high-capacity wireless communications protocol.

In some embodiments, entity location verification uses multiple independent agents arranged in an ad-hoc association network. This association can be based on agents in a geofence coordinate-defined area, location, or peer-ID brokerage, with each agent assigned a common level of trustability, quantified as the credibility metric.

In another embodiment, the requestor of location verification services demands classification or credentials regarding the agents used to provide verification. Credentials are established through the use of certified and trusted entity service providers. As an example, well-known businesses, organizations, and government entities such as cities and states can provide credentials to identify themselves as such to provide a higher level of credibility as opposed to an unknown service provider.

Various methods can be used to provide location of an entity. These include, but are not limited to photographs, imaging, radar images, laser images, sonar images, RFID data, and GPS data.

The manner of providing location verification for an entity using one or more independent agents is unavailable in the presently available methods in the technological field of endeavor pertaining to location verification. A method of an embodiment described herein, when implemented to execute on a device or data processing system, comprises a substantial advancement of the functionality of that device or data processing system in verifying the location of an entity.

The illustrative embodiments are described with respect to certain types of agents, cameras, images, telemetry, sensors, devices, data processing systems, environments, components, and applications only as examples. Any specific manifestations of these and other similar artifacts are not intended to be limiting to the invention. Any suitable manifestation of these and other similar artifacts can be also selected within the scope of the illustrative embodiments.

Furthermore, the illustrative embodiments may be implemented with respect to any type of data, data source, or access to a data source over a data network. Any type of database or data storage device may provide the data to an embodiment of the invention, either locally at a data processing system or over a data network within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
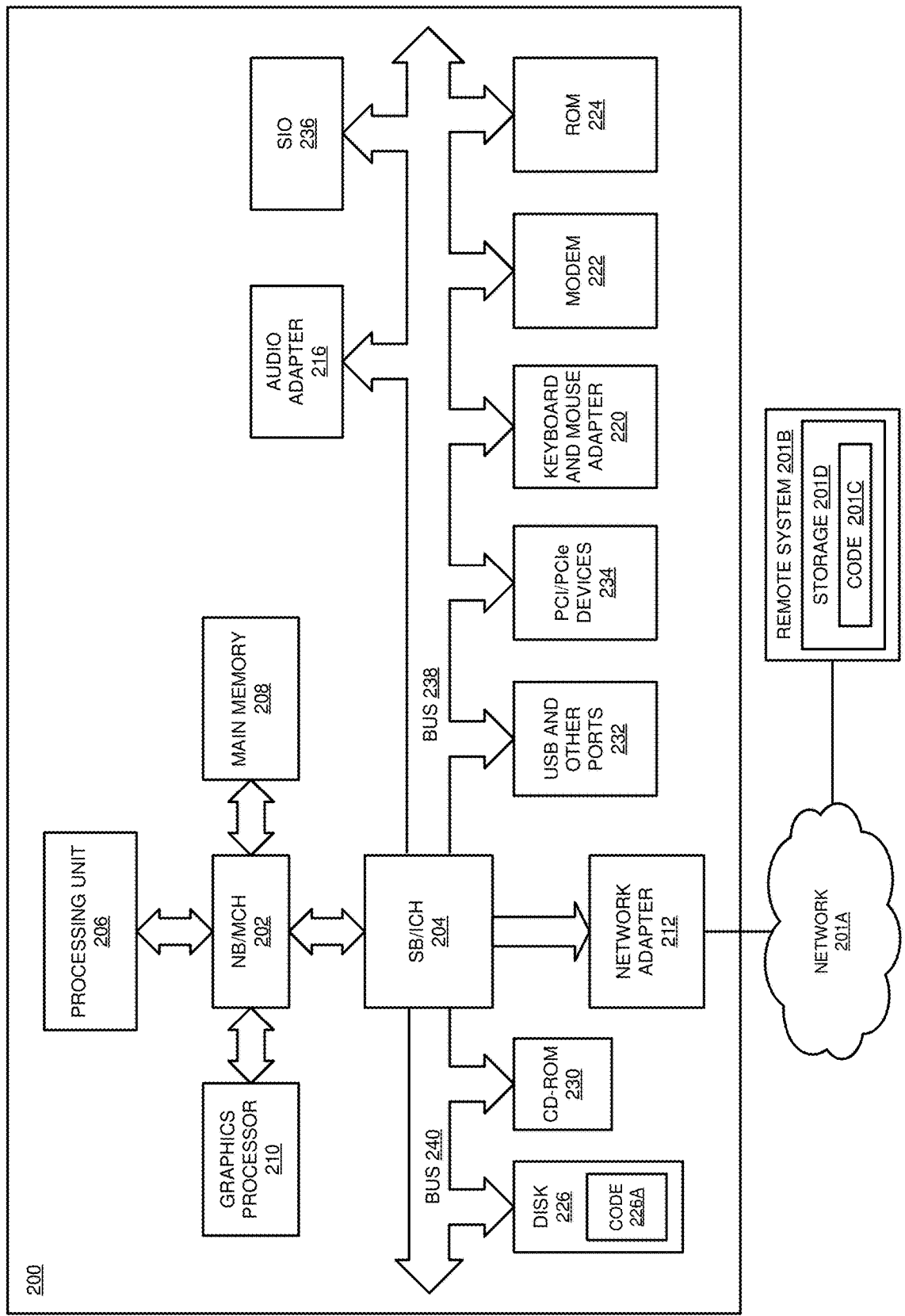
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. In one embodiment, application 105 uses client 114 to request an image from a camera associated with client 114 to transmit location data of the entity in the camera's field of view. In addition, the application 105 assigns a credibility metric value to the client 114 based at least on part on the reliability of the client 114, the inherent location accuracy of the camera associated with the client 114, the transmission speed of communications between the client 114 and the application 105 and the like.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
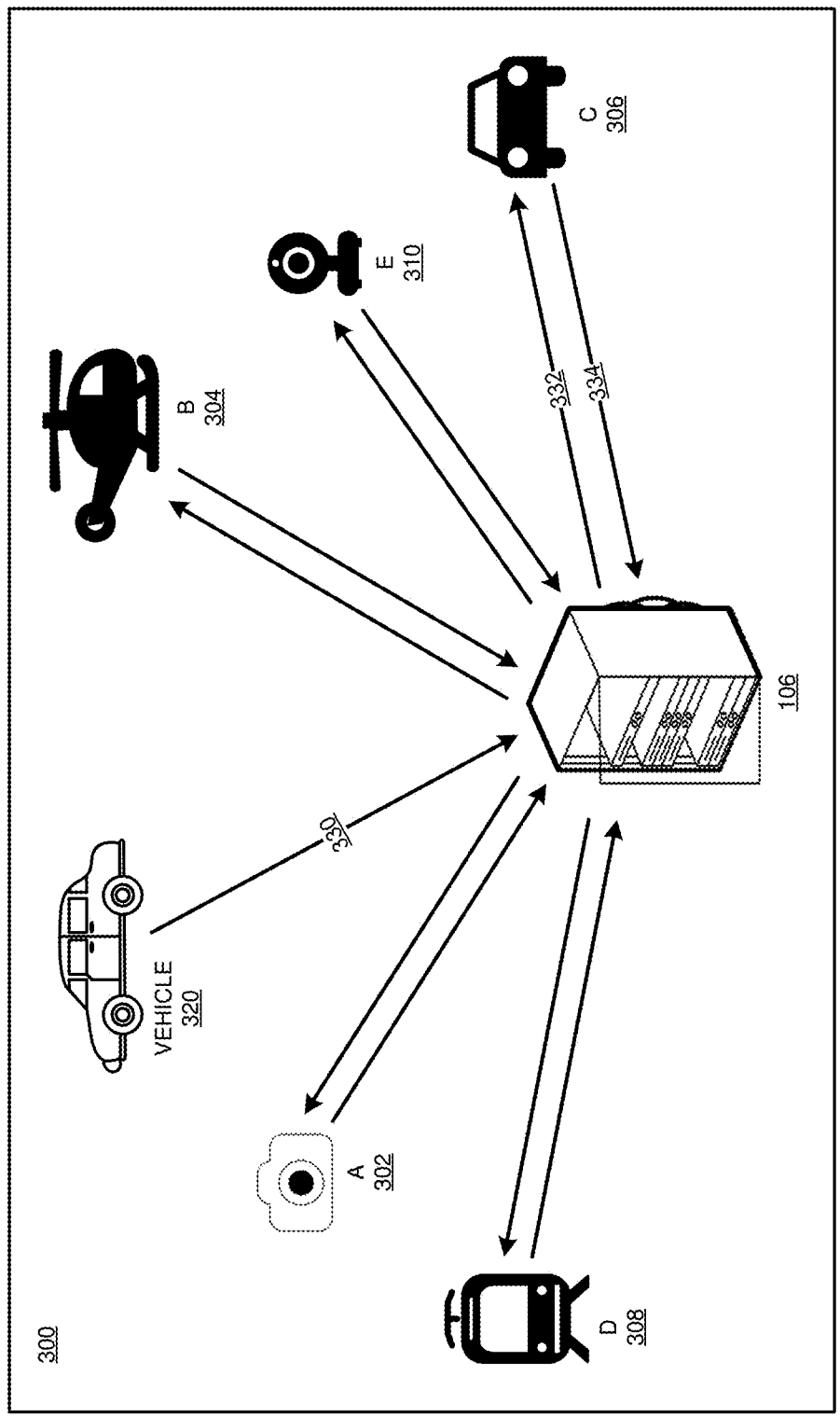
FIG. 3 depicts a functional diagram of an example verifier for providing location verification for an entity using one or more independent agents in accordance with an illustrative embodiment.

With reference to FIG. 3, this figure depicts a functional diagram of an example verification system (verifier) 300 for providing location verification for an entity using one or more independent agents in accordance with an illustrative embodiment. Verification system 300 is an example of application 105 of FIG. 1 and executes in any of servers 104 and 106, clients 110, 112, and 114, and device 132 in FIG. 1. The server 106, running the application 105, begins the process by receiving unverified location data 330 from the vehicle 320 and then receives a verification request from a verifier. To comply, the server 106 selects a subset of agents 302, 304, 306, 308, 310 to begin tracking and reporting on the location of the vehicle 320. Each agent 302, 304, 306, 308, 310 attempts to take an image or otherwise sense the location of the entity such as vehicle 320 and send the location data to the server 106 for further processing.

A set of one or more agents 302, 304, 306, 308, 310 are in communication with the server 106, with each agent 302, 304, 306, 308, 310 operating as clients 110, 112, and 114 of FIG. 1. Each agent 302, 304, 306, 308, 310 includes a sensor such as an imaging camera, a GPS receiver, a sound detector, and the like with the capability to record the location of an entity and transmit that location data to the application 105 for further analysis. In one embodiment, agent 302 is a stationary security camera attached to a building's exterior wall. Continuing with this embodiment, the agents are an airborne drone 304, a police vehicle 306, a commuter train 308, and a portable camera 310 attached to a laptop computer. Other embodiments are possible and are not limited by this example.

Each agent 302, 304, 306, 308, 310 operates independently of another agent 302, 304, 306, 308, 310 in that imaging the vehicle 320 and sending the location data of that vehicle 320 is not dependent upon the operation or presence of another agent 302, 304, 306, 308, 310. As an example, equipment failure of agent 304 does not preclude agent 310 from operating in full capacity.

As shown in FIG. 3, the server 106 sends a request 332 to each agent 302, 304, 306, 308, 310 which results in that agent to report on the presence and location data of the vehicle 320. The agent 302, 304, 306, 308, 310 then reports the location data in a location data transmission response (response) 334 back to the server 106. In some embodiments, the response 334 contains no useful data if the agent 302, 304, 306, 308, 310 fails to acquire or identify the vehicle 320 within its field of view.

The response 334 contains information identifying the vehicle 320, including but not limited to an image, location data, time stamp information including transmission times, probability of error of the location data, and the like. From this information, the server 106 assigns a quality value, or credibility metric to each agent 302, 304, 306, 308, 310.

The server 106 stores the response 334 from each agent 302, 304, 306, 308, 310 and assigns a credibility metric value to each agent 302, 304, 306, 308, 310. In this manner, the server 106 computes the relative weight of each agent 302, 304, 306, 308, 310 and calculates the significance of each response 334 based on the credibility metric.

As an example, agent 304 is an airborne drone that has received request 332 to report on the location of the vehicle 320. However, the airborne drone 304 occasionally selects the wrong target entity once given as assignment request 332 to track an entity. Accordingly, the server 106 assigns a lower credibility metric to the location data received from the airborne drone 304.

According to some embodiments, the requestor specifies a frame of reference as it relates to the location data. The frame of reference is in a subset of a set of data comprising a geospatial location, a geofence, and a time window and is included in the response 334 from the agent back to the server 106.

Figure 4:
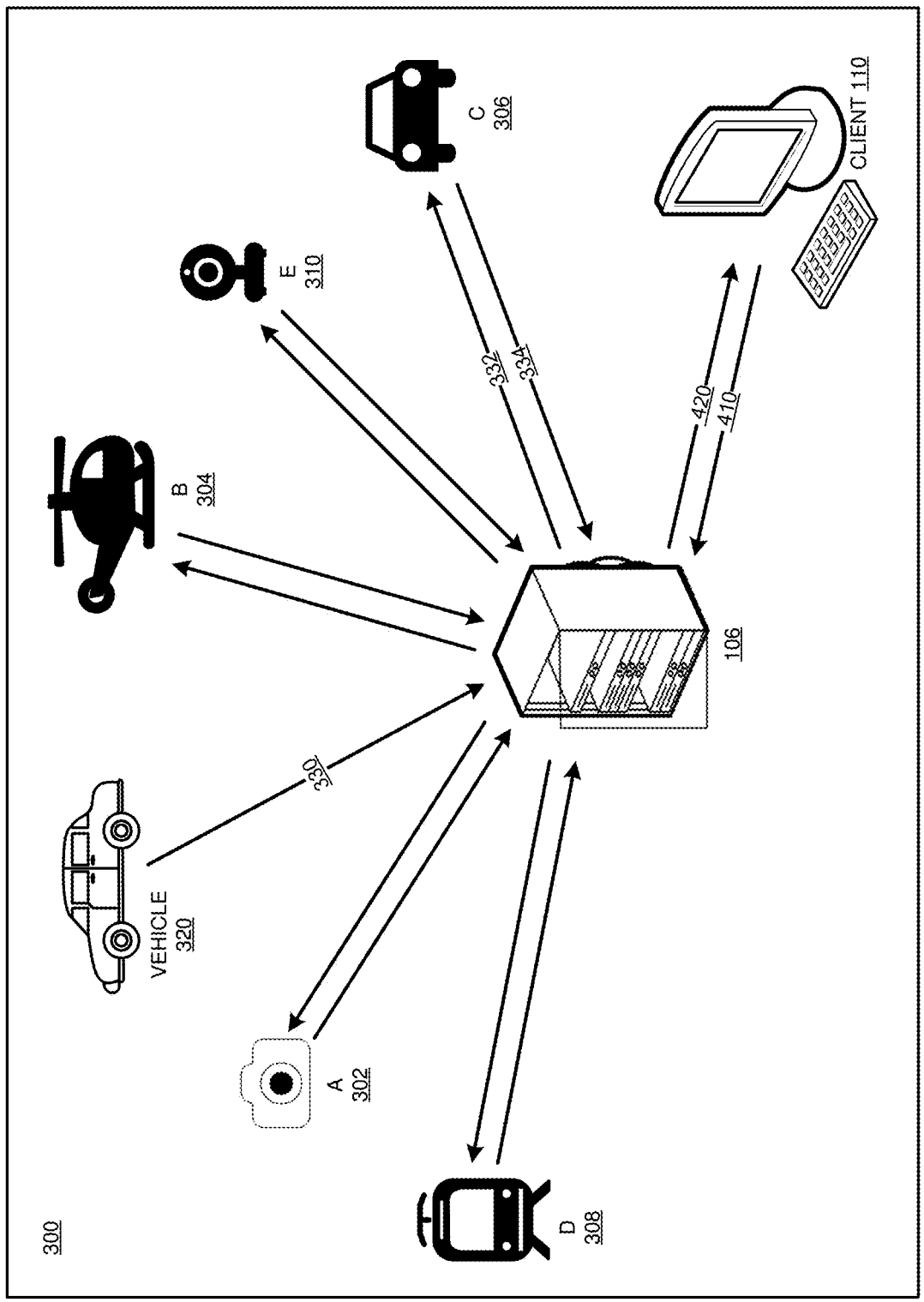
FIG. 4 depicts another functional diagram of an example verifier for providing location verification for an entity as requested by an independent third party using one or more independent agents in accordance with an illustrative embodiment.

With reference to FIG. 4, this figure depicts another functional diagram of an example verification system 400 for providing location verification for an entity as requested by an independent third party using one or more independent agents in accordance with an illustrative embodiment. FIG. 4 is similar to the system disclosed in FIG. 3, but with the addition of an independent third party originating the location verification request. In the present embodiment, the independent third party is represented by the client 110.

Client 110 begins the process of verifying location data of an entity by sending a verification request 410 to the server 106. In the present embodiment, client 110 does not have the access or authority to communicate with or otherwise control any of the agents 302, 304, 306, 308, 310. In the request, the client 110 specifies what entity they want to verify, for what time period the verification should encompass, and a verification value threshold.

Figure 6:
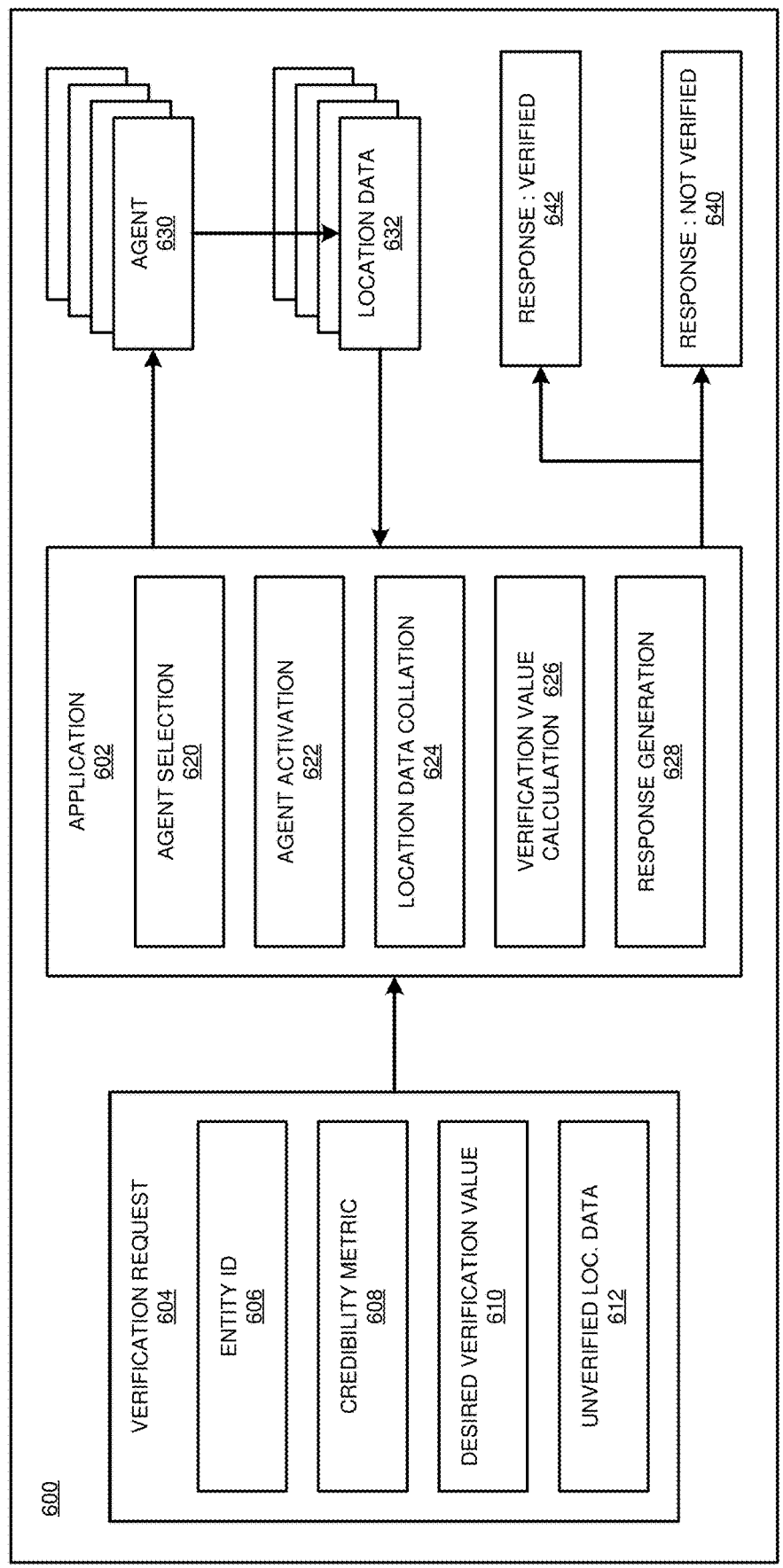
FIG. 6 depicts a functional block diagram of an application for verifying location data of an entity using independent agents in accordance with an illustrative embodiment.

Once the server 106 receives the request, the process disclosed in FIG. 3 is followed. Once the server 106 completes the process of collating the responses 334, the server 106 sends a verification response 420 back to the client 110. The verification response 420 contains information on the location of the vehicle 320, the verification value, and a conclusion whether the location of the vehicle 320 has been verified or unverified. FIG. 6 discloses additional details about the verification process as disclosed herein.

Figure 5:
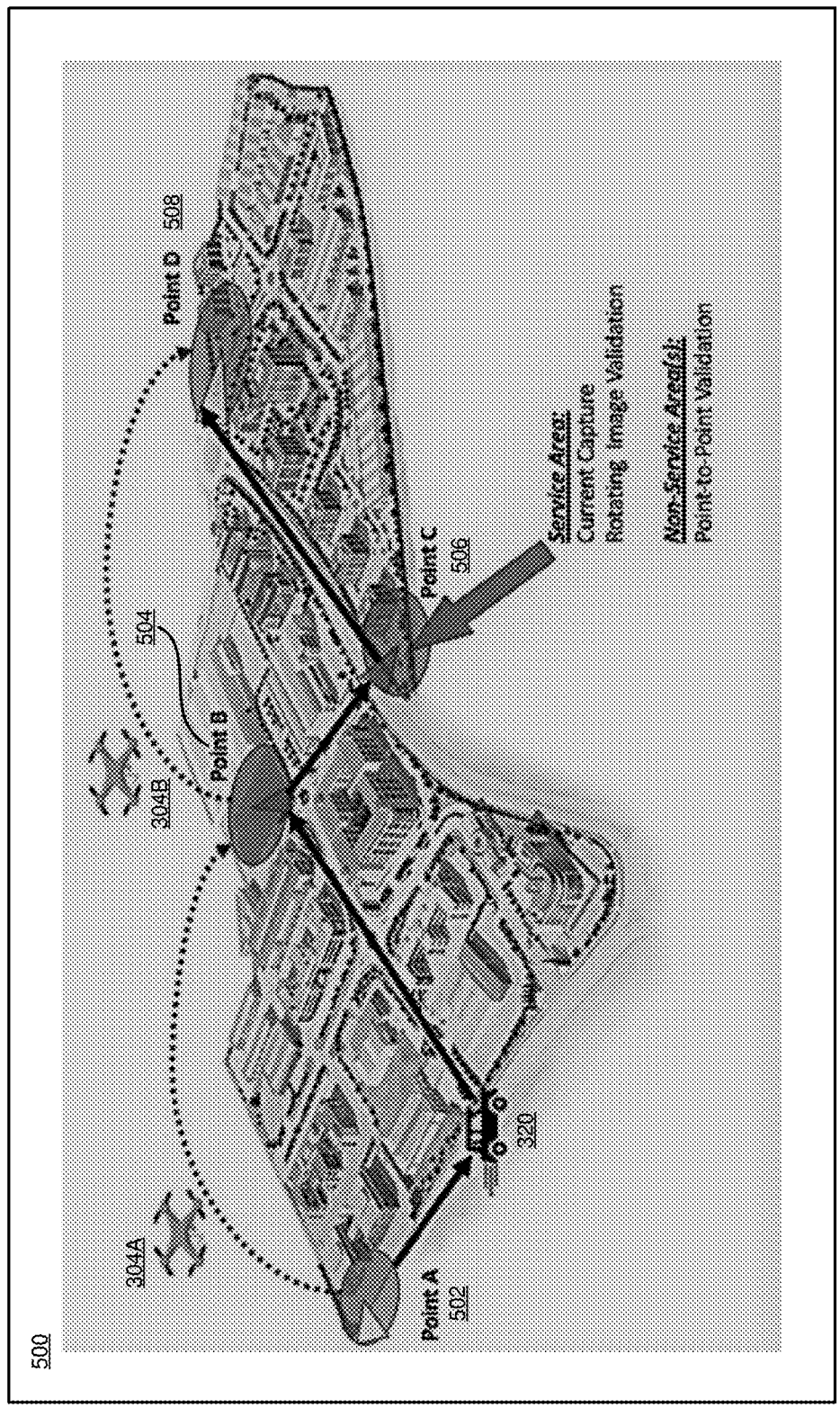
FIG. 5 depicts an example of providing location verification for a delivery vehicle using two independent drone agents in accordance with an illustrative embodiment.

With reference to FIG. 5, this figure depicts an example 500 of providing location verification for a delivery vehicle using two independent drone agents 304A, 304B in accordance with an illustrative embodiment. The example can be executed using application 105 in FIG. 1. As depicted, the vehicle 320 is moving in a geographical area from one service area to another service area while being monitored by two drones 304A, 304B. The service areas are regions where the vehicle 320 can be monitored by agents in the region. The service areas are represented by points, such as Point A 502, Point B 504, Point C 506, and Point D 508. As the vehicle 320 moves, it leaves one service area and is monitored by at least one of the drones 304A, 304B until the vehicle 320 enters another service area. During the journey, vehicle 320 is monitored continuously and a collection of location data is collected by the server 106.

With reference to FIG. 6, this figure depicts a functional block diagram of a verification application process 600 for verifying location data of an entity using independent agents in accordance with an illustrative embodiment. The application can be executed by the server 106 in FIG. 1. The verification application process 600 includes the application 602 which includes an agent selection process 620, an agent activation process 622, a location data collation process 624, a verification value calculation 626, and a verification response generation process 628.

The verification application process 600 also includes a verification request 604 which includes entity identification data 606, a credibility metric value 608, a desired verification value threshold 610, and unverified location data 612 of the entity needing to be verified.

Communication between the application process 600 providing location verification, the requestor generating the verification request 604, and the agents 630 can be, but is not limited to, a 5G network, Bluetooth, BLE, Z-Wave, WiFi, LTE, or Dash7 protocols. The agent 630 can also communicate location data using social-based web applications, ad-hoc networks, private networks, decentralized open-air networks, broker-based services, and IoT-based networks.

In some embodiments, the application 602 establishes the availability to provide location verification of each agent by providing proof of identity, disclosing credentials, and current status of each agent.

The verification application process 600 also includes a set of agents 630 that each generates location data reports 632, and a response from the application 602 being either that the entity location is not verified 640 or that the entity location is verified 642. The response, either not verified 640 or verified 642, is then sent back to the original requestor, being either the verification system 300 in FIG. 3 or the independent third party 110 in FIG. 4.

With reference to FIG. 7, this figure depicts an example of a verification request response data format 700 in accordance with an illustrative embodiment. The example can be executed using application 602 in FIG. 6. The data format 700 includes columns titled index 702, location data 704, credibility metric 706, and verification value 708. For each asset 302, 304, 306, 308, 310 of FIG. 3 that is responding to a request for location data, a row 710, 712, 714 is added to the data list. The index 702 is an identifier for each row entry and can be a transmission time, a time entry, a unique number, or other identifier to distinguish each row entry 710, 712, 714 as unique. The location data column 704 contains unverified location data of the entity in a standard format such as GPS coordinates, latitude/longitude coordinates, and the like.

Next, the credibility metric column 706 is a qualitative value assigned by the server 106 and denotes a mathematical weight assigned to each agent as disclosed herein. The verification value column 708 is based on the response of the application process 600 after considering all of the factors in determining the accuracy of the aggregate location data collated on the entity.

Figure 8:
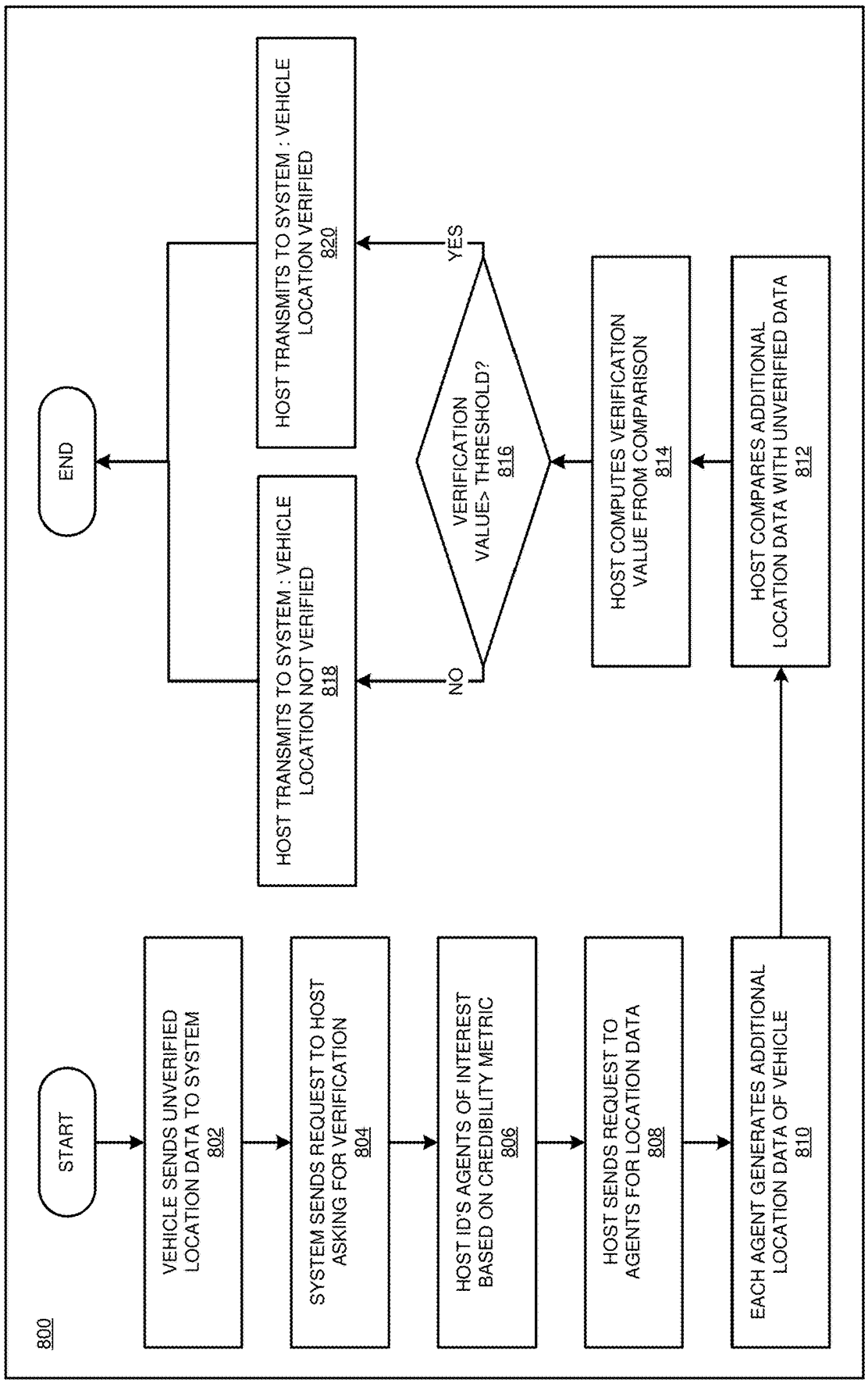
FIG. 8 depicts a flowchart of an example process for providing location verification for an entity using one or more independent agents in accordance with an illustrative embodiment.

With reference to FIG. 8, this figure depicts a flowchart of an example process 800 for validating the location of an entity using independent agents in accordance with an illustrative embodiment. Process 800 can be implemented in application 602 in FIG. 6. In block 802, the process starts by an entity transmitting unverified location data to a system such as server 106 of FIG. 1. In block 804, the system generates a request to the host application 602 asking for verification of the location data sent by the entity. The request includes a credibility metric value, selected by the system, which chooses a level of confidence in the location data sent by that asset. In block 806, the host application 602 identifies one or more eligible agents. In block 808, the host application 602 sends each agent a request to transmit location data on the entity. In block 810, each agent in the subset of agents generates location data and sends the location data to the application 602. Next, in block 812, the host application 602 compiles all of the location data reports created by the subset of agents and compares the aggregate collated data with the original unverified location data sent by the system in block 804. In block 814, the host application computes a verification value based on the unverified location data and the aggregate collated location data. In decision block 816, the host application 602 generates one of two responses to the original request. If the computer verification value is less than the verification value threshold specified at the beginning of the process, verification of the unverified location data is negative. If, however, the computed verification value is equal to or greater than the verification value threshold, the verification is positive.

If the verification is negative, the process moves to block 818, where the verification response is transmitted back to the original requestor, be it either the system 300 or the independent third party 110. If the decision in block 816 is positive, the process 800 moves to block 820, where a positive verification response is generated and sent to the original requestor. Then, the application ends.

Thus, a computer implemented method, system or apparatus, and computer program product are provided in the illustrative embodiments for independent agent-based location verification and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving, at an agent in a subset of a set of agents, a request to verify a location of an entity, the location of the entity comprising an unverified location data obtained from the entity, wherein each agent in the subset of agents satisfies a credibility metric specified in the request, wherein the request specifies a verification type, wherein the verification type specifies that each agent in the subset of agents is operated by a public government agency;
generating, at the agent, a second location data corresponding to the entity;
causing, responsive to the generating, a computation of a verification value; and
transmitting the verification value in a response, wherein the verification value is indicative of a rejection of the location of the entity responsive to the location of the entity failing to be within a tolerance value of the second location.

2. The method of claim 1, further comprising:
receiving, at the agent, a second request to verify a second location of a second entity, the second location of the second entity comprising a second unverified location data obtained from the second entity;
generating, at the agent, a third location data corresponding to the second entity;
causing, responsive to the generating the third location data, a computation of a second verification value; and
transmitting the second verification value in a second response, wherein the second verification value is indicative of a verification of the second location of the second entity responsive to the second location of the second entity being within the tolerance value of the third location.

3. The method of claim 1, wherein each agent in the subset of the set of agents is independent of another agent in the subset of agents, and wherein the agent is unrelated to the entity.

4. The method of claim 1, wherein the agent in the subset of the set of agents comprises a global positioning system device mounted on the entity which periodically transmits location data.

5. The method of claim 1, wherein the agent in the subset of the set of agents comprises a radio frequency identification device which transmits location data when prompted.

6. The method of claim 1, wherein the location data comprises a subset of a set of data comprising geographic coordinate data, a time stamp, and an image of the entity.

7. The method of claim 1, wherein the response is stored in an immutable data storage device.

8. The method of claim 7, wherein the immutable data storage device is a blockchain data storage device.

9. The method of claim 1, further comprising a requestor that generates the request, wherein the requestor has authority to access the agent.

10. The method of claim 1, further comprising a requestor that generates the request, wherein the requestor is the entity.

11. The method of claim 1, further comprising a requestor that generates the request, wherein the requestor is an independent third party without direct access to the agent.

12. The method of claim 1, wherein the entity is in a subset of a set comprising an animal fitted with a tracking device, a global positioning system receiver mounted onto a shipping container that transmits location data periodically, a camera mounted onto a police vehicle, a mobile camera on a laptop, a radio frequency identification tag attached to cargo that transmits location data when prompted, and a cell phone carried by a person.

13. The method of claim 1, further comprising assigning a frame of reference to the location data, wherein the frame of reference comprises a subset of a set of data comprising a geospatial location, a geofence, and a time window.

14. The method of claim 1, wherein the credibility metric is based on accuracy of the location data generated by the agent.

15. The method of claim 1, wherein the verification value is based on at least a subset of a set comprising aggregate location data, aggregate credibility metrics, and transmission times of each response.

16. A computer usable program product comprising one or more computer-readable storage devices and program instructions stored in a subset of a set of storage devices, the stored program instructions comprising:
program instructions to receive, at an agent in a subset of a set of agents, a request to verify a location of an entity, the location of the entity comprising an unverified location data obtained from the entity, wherein each agent in the subset of agents satisfies a credibility metric specified in the request, wherein the request specifies a verification type, wherein the verification type specifies that each agent in the subset of agents is operated by a public government agency;
program instructions to generate, at the agent, a second location data corresponding to the entity;
program instructions to cause, responsive to the generating, a computation of a verification value; and
program instructions to transmit the verification value in a response, wherein the verification value is indicative of a rejection of the location of the entity responsive to the location of the entity failing to be within a tolerance value of the second location.

17. The computer usable program product of claim 16, wherein the stored program instructions is computer usable code stored in a computer readable storage device in a data processing system, and wherein the stored program instructions is transferred over a network from a remote data processing system.

18. The computer usable program product of claim 16, wherein computer usable code is stored in a computer readable storage device in a server data processing system, and wherein the computer usable code is downloaded over a network to a remote data processing system for use in a computer readable storage device associated with the remote data processing system.

19. A system, comprising:
a processor;
a computer-readable memory;
a computer-readable storage device; and
program instructions stored on the storage device for execution by the processor via the memory, the stored program instructions comprising:

program instructions to receive, at an agent in a subset of a set of agents, a request to verify a location of an entity, the location of the entity comprising an unverified location data obtained from the entity, wherein each agent in the subset of agents satisfies a credibility metric specified in the request, wherein the request specifies a verification type, wherein the verification type specifies that each agent in the subset of agents is operated by a public government agency;

program instructions to generate, at the agent, a second location data corresponding to the entity;

program instructions to cause, responsive to the generating, a computation of a verification value; and program instructions to transmit the verification value in a response, wherein the verification value is indicative of a rejection of the location of the entity responsive to the location of the entity failing to be within a tolerance value of the second location.

\* \* \* \* \*